(12) United States Patent
Park et al.

(10) Patent No.: US 7,991,734 B2
(45) Date of Patent: Aug. 2, 2011

(54) REMOTE POINTING

(75) Inventors: Seung-Hae Park, Seattle, WA (US);
Rachel Popkin, Seattle, WA (US);
Heather Ferguson, Centralia, WA (US)

(73) Assignee: Microsoft Corporation, Redmond, WA (US)

( * ) Notice: Subject to any disclaimer, the term of this patent is extended or adjusted under 35 U.S.C. 154(b) by 355 days.

(21) Appl. No.: 12/044,753

(22) Filed: Mar. 7, 2008

(65) Prior Publication Data
US 2009/0228524 A1 Sep. 10, 2009

(51) Int. Cl.
*G06F 17/00* (2006.01)
(52) U.S. Cl. .................. 707/610; 707/609; 707/621
(58) Field of Classification Search .................. 707/705, 707/609, 610, 621; 455/419; 709/217, 218, 709/219
See application file for complete search history.

(56) References Cited

U.S. PATENT DOCUMENTS

| 6,091,409 | A | 7/2000 | Dickman et al. |
| 6,115,741 | A * | 9/2000 | Domenikos et al. .......... 709/217 |
| 6,687,745 | B1 | 2/2004 | Franco et al. |
| 7,254,786 | B2 | 8/2007 | Henriquez |
| 7,448,033 | B1 * | 11/2008 | Kruger et al. ................. 717/175 |
| 2004/0145605 | A1 | 7/2004 | Basu et al. |
| 2004/0181576 | A1 * | 9/2004 | Lin et al. ....................... 709/203 |
| 2004/0186859 | A1 * | 9/2004 | Butcher ........................ 707/200 |
| 2005/0125530 | A1 | 6/2005 | Brockway et al. |
| 2005/0125560 | A1 | 6/2005 | Brockway et al. |
| 2005/0229106 | A1 | 10/2005 | Labarge et al. |
| 2007/0061416 | A1 * | 3/2007 | Gould ........................... 709/217 |
| 2007/0180407 | A1 | 8/2007 | Vahtola |
| 2009/0036111 | A1 * | 2/2009 | Danford et al. .............. 455/419 |

OTHER PUBLICATIONS

"EMCO Remote ShortCut Manager v1.0", at <<http://www.emco.is/remote_shortcut/features.html>>, retrieved on Oct. 22, 2007, pp. 1.

* cited by examiner

*Primary Examiner* — Mohammad Ali
*Assistant Examiner* — Thuy (Tiffany) Bui
(74) *Attorney, Agent, or Firm* — Lee & Hayes, PLLC

(57) ABSTRACT

Techniques for remote redirection are discussed. Redirection may be used to mimic a local user experience on a remote system. Redirection may include redirecting a pointer file, such as a shortcut, to account for remote access to a source file designated in the pointer file. The pointer file may be remapped so that the pointer file's file path accounts for a path from the remote access to the source file. Operating system (OS) information may be forwarded to the accessing system so that the redirected pointer file may be presented in accordance with the remote system's (OS). Redirection may be used to present a directory remotely in accordance with operating system running on the system being accessed.

15 Claims, 4 Drawing Sheets

REMOTE POINTING

BACKGROUND

A remote computing user experience may be different than if a user were to locally interact with the host system. During remote computing, a pointer file used to direct the computing system to the local location of a file may not function properly as the pointer file path may be configured for local access. For instance, a shortcut which directs the computing system, i.e., the system being accessed, to a data file may not properly access the file because the shortcut path may be configured for local access, i.e., the local system, accessing the file specified by the pointer file. A pointer file may be represented by a generic icon during remote access. Host shortcuts may be presented in a generic manner, as the client may not accurately reflect the host operating system (OS). In contrast when locally accessing the pointer file the shortcut may have a different appearance and/or behavior.

Moreover, remote computing interfaces may implement large files and load slowly in comparison to local interaction with the remote computing system. For instance, a remote access interface may use a large applet which is loaded on to the client system when remotely accessing a host system.

SUMMARY

Techniques for remote redirection are discussed. Redirection may be used to mimic a local user experience on a remote system. Redirection may include redirecting a pointer file, such as a shortcut, to account for remote access to a source file designated in the pointer file. The pointer file may be remapped so that the pointer file's file path accounts for a path from the remote access to the source file. Operating system (OS) information may be forwarded to the accessing system so that the redirected pointer file may be presented in accordance with the remote system's OS. Redirection may be used to present a directory remotely in accordance with operating system running on the system being accessed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Accordingly, techniques are described for providing remote pointing and/or remote folder presentation. The techniques may be used to cause the remote user experience (UX) to imitate the local user experience (UX) as if, the remote system were locally accessed. A pointer file, which provides a local path for accessing a source file, e.g., a target, may be redirected during remote access so that the file path of the pointer file reflects the path from the local system (client) which accesses the targeted source file on the remote system (host). Source files may include, but are not limited to, directories, subdirectories data files containing user data application files, for performing a function, and so on. The client's presentation, configuration and/or arrangement of pointer file icons, may be in accordance with the operating system (OS) of the remote (host) computing system in order to mimic the host UX.

A local file directory and the directory's contents on the host/remote system may be redirected, so the remote UX imitates that of the host computing system being locally accessed. The directory (which is local to the remote system) may be remotely presented, including subdirectories and/or files, so that the remotely presented user interfaces (UI) mimics the (the remote system's locally experienced) UI, as if the remote system was accessed locally, in accordance with the remote system's OS. In this manner, the UI on the web interface may match that of the remote system being locally accessed.

A remotely accessed computing system may include a file synchronization module for remotely presenting a directory which is local to the accessed computing system. The synchronization module may identify and forward the directory including relevant subdirectories and/or files with an indication of the OS executing on the remote system. In this fashion, when remotely displayed, the directory UI may reflect the UI of the directory as if the remote system was locally accessed.

A redirection module may be included in a computing system. The redirection module may be configured to redirect the file path of a pointer file so that the file path may be defined between the client (i.e., the local system) accessing a source file on the remote system. Once redirected, the pointer file may include a file path which maps access from the client to the source file. As a result, during remote access, the pointer file may provide a file path which causes the client to access the source file designated in the pointer file. The redirection file may be configured and/or arranged so that the pointer file icon or graphical object for accessing the pointer file's file path may be presented according to the OS of the remote computing system.

Exemplary Environment

Figure 1:
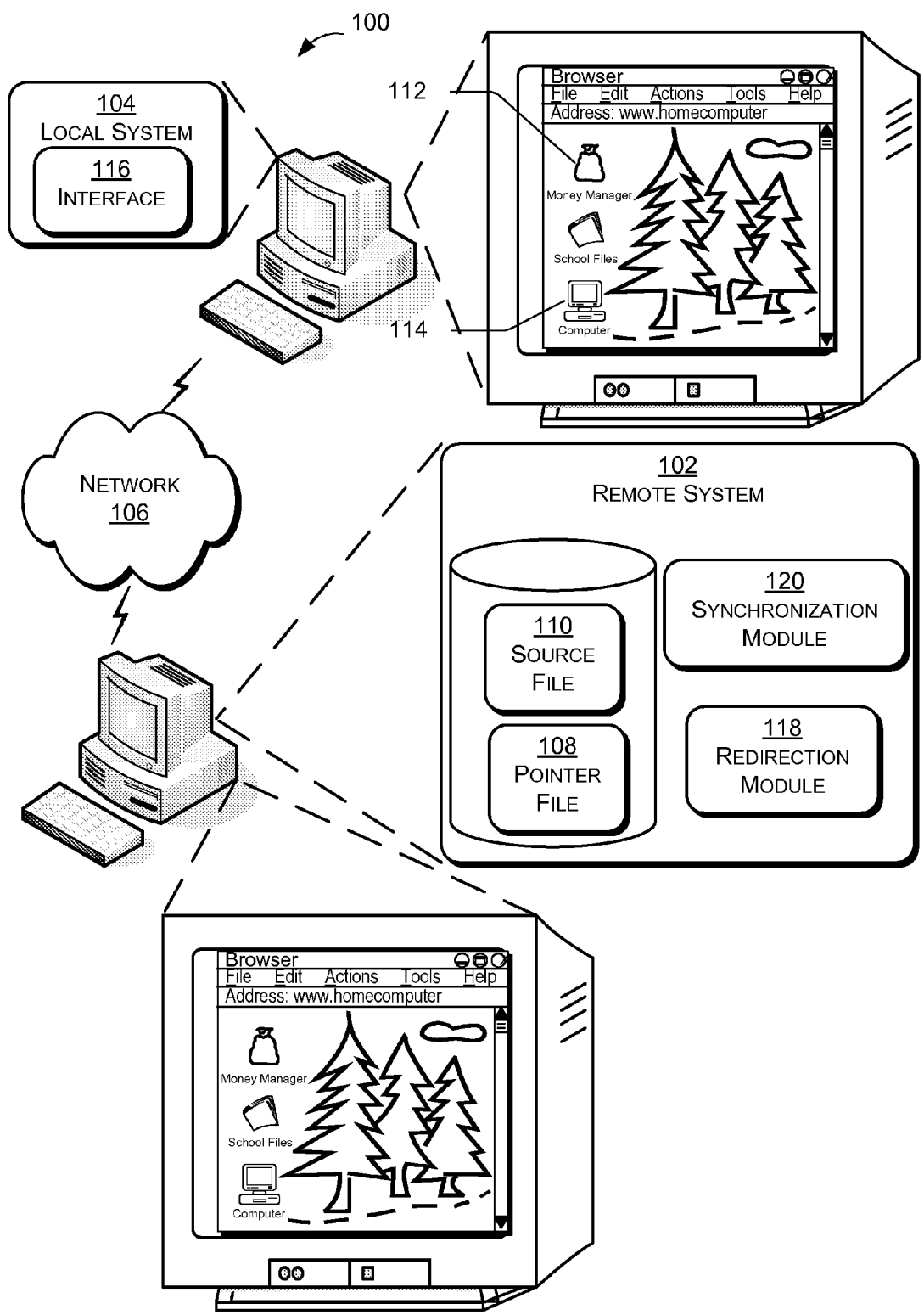
FIG. 1 illustrates an environment in exemplary implementations that may use remote pointing redirection.

FIG. 1 illustrates an environment 100 in exemplary implementations that may permit a UX to mirror a local UX for a remote system 102. For example, a remote user interface (UI), on a client or local system 104, may mirror a UI on the remote system 102 when accessed locally. For example, when accessing a remote computing system 102 (a host) via a networked 106 web interface from a (client) computing system 104, a pointer file 108 may not direct the web interface to the proper location of the source file 110 on the remote system 102.

While the term "computing system" is implement with respect to the client system and host system, it is to be appreciated that this may include "thick" devices offering robust computing functionality, such as desktop computers, laptops, and so on as well as "thin" device having relatively lesser computing functionality, such as smart phones, personal digital assistants (PDAs) and so on.

Exemplary pointer files may include, but are not limited to, shortcut files used with systems implementing Microsoft Corporation (Redmond, Wash.) products; alias files which are implemented with Apple, Inc. (Cupertino, Calif.) products; a Palm OS (Palm, Inc., Sunnyvale, Calif.) products, pointer file.

The pointer file 108 may be displayed as a graphical object which, when selected, e.g., clicked on, provides a file path or a series of instructions that causes the computing system to accesses a designated source file 110. For instance, a shortcut to a financial data file may be represented by a "money bag" 112 icon, while selecting a computer icon 114 may causes the system to access a hard drive directory on the remote system 102.

During remote access, a pointer file 108 may not access the source file 110 because the pointer file's original file path may be configured for local access. For instance, if the file path is considered as a set of map directions for reaching the source file 110, the original local directions may not indicate the full path from the remote access point (e.g., a web interface 116 appearing on local system 104) to the source file (residing on the remote system 102). In other words, the file path may be configured with the presumption that the pointer file 108 is being locally accessed. As a result, when accessing the remote computing system 102 remotely, such as from another computer via a web interface 112, the pointer file, when selected, may return an error message as the pointer file does map remote access to the source file. In some instances, the pointer file may be downloaded to client system 102 before the file path is accessed via the browser. Downloading the file may be time consuming. The foregoing errors may occur even though the source file is present and may be manually accessed.

A redirection module 118 may be included on the remote computing system 102, i.e., the computing system being access. The redirection module 118 may redirect the file path for the pointer file 108, so that the source file 110 may be remotely accessed by a web enabled client system 104. The redirection module 118 may be configured to identify a pointer file based on a characteristic of the pointer file. For example, in WINDOWS (Microsoft Corporation, Redmond, Wash.) a shortcut file represented by an icon may be identified based on the file extension of the shortcut file. In this case, the shortcut file extension may be a link file extension (".lnk") which appears at the end of the file name for the shortcut file. The redirection module 118 may identify the shortcuts by searching for files having a ".lnk" extension at the end of the file name. Other characteristics of a pointer file may be used to identify the file as a pointer file. For example, the redirection module may identify a shortcut file by the instructions within the pointer file itself, the structure of the file and so on.

The redirection module 118 may identify other characteristics from the pointer file 108. For example, the redirection module 118 may determine the OS running on the computing system 102 based on pointer file content. The type of OS running on the computing system, the version of the OS, and so on may be obtained from the pointer file. In other instances, the redirection module 118 may access other files to determine OS information. Determining the OS running on the remote computing system 102 may allow the shortcut icons, such as money bag and computer, respectively, 112 and 114, to be presented in accordance with the OS of the remote system 102. For instance, if a shortcut element has a particular appearance, arrangement, and so on, the redirection module may forward the OS information so that the web interface presents the pointer files according to the remote computing system OS. In this way, the pointer file 108 may be displayed and have behaviors which mimic that of how the pointer file 108 would appear and behave if accessed locally. For example, the arrangement, form, appearance and behavior of graphical objects may represent how the shortcut files would function if locally accessed. For instance, in VISTA OS (Microsoft Corporation, Redmond, Wash.) web folders may preview the contents in the icon, while in XP OS (Microsoft Corporation, Redmond, Wash.) a folder icon may not. In this manner, the icons, behaviors of the remote system OS may be reproduced remotely as the remote system informs the client how to present the information. These procedures may be done without having to load a large applet at the start of a remote session. For example, if a user remotely accessed a VISTA (Microsoft Corporation, Redmond, Wash.) machine, the icons may include a preview, even though this behavior may not occur on the client system.

The redirection module 118 may run as a background application which redirects the file path of pointer files during remote access. Redirection may include generating or mapping a new pointer file which includes file path instructions from the remote web interface and/or remote computing system. For example, upon initiating a session, the redirection module 118 may map a pointer file from the remote web interface 116 to the source file 110 such as a server message block (SMB). The redirected pointer file may be temporarily stored for use during the remote session. Upon terminating the remote session, the pointer file may be discarded. The redirection module 118, in contrast, may map the pointer file's file path upon selecting the pointer file. For example, a pointer file may be mapped when a shortcut icon is selected. In other instances, commonly used pointer files may be mapped upon initiating the remote session, while other comparatively less used pointer files may be mapped at intervals in order to minimize the time associated with initial loading.

In examples, the redirection module 118 may augment and/or correct the original file path within the pointer file. For instance, the pointer file's file path may be updated for the session, so that the file path accounts for the remote access. In this manner, while the pointer file icon appears and/or behave as if locally accessed, the file path may be updated to reflect the instructions for accessing the source file from the remote computing system presenting the web interface. The redirection module 118 may add additional file path mapping to account for the remote access. For example, the redirection module 118 may test a pointer file to determine if the graphical object associated with the pointer file accesses the source file 110. For example, the redirection module 118 may test to determine which individual instructions may be used during remote access. If the source file 110 designated in the pointer file 108 is not accessed, the redirection module 118 may correct or augment the file path so that the redirected pointer file maps directions from the remote web interface 118 to the location of the source file. For example, a shortcut may still map to the server message block (SBM) location although the file path may be varied to account for the remote session. In this manner, the representation of the pointer file may be forwarded to the client for presentation in accordance with the OS of the remote system.

In implementations, a file synchronization module 120 may be included for presenting a local directory (e.g., file) on a remote system during a remote session. The file synchronization module 120 may redirect the directory, e.g., folder (including the contents (e.g., subfolders, files) and so on) in accordance with the OS running on the remote computing system 102. This is to say, that the file synchronization module 120 on the remote computing system 102 may mirror a user directory in accordance with the OS of the remote system 102 so that the remote UX mirrors the local UX.

During remote presentation, the user directory may include pointer file icons associated with directories, subdirectories, files and so on. These graphical elements may be configured and arranged to mimic the UX of the remote system as discussed above. In a similar manner as the redirection module 118 discussed above, the file synchronization module 120 may determine the particular OS based on characteristics of the directory, content included within the directory, files external to the directory and so on. For example, the OS and the particular version being used may be determined from characteristics associated with one or more of the directory itself, or a file or subdirectory in the main directory.

During remote access, the determined OS information may be forwarded to the client system 104 presenting the web interface 116 with the contents of the directory. The OS information may be used to remotely present the directory so the remote UX matches that of the local UX. For instance, while a first OS may contain a particular file, another OS, may not include the file. Thus, if the first OS is on the remote system 102 the particular file may be presented on the web interface even thought the client OS would not present the particular file if locally accessed.

By using the determined OS information, the web interface 116 may mimic the appearance, contents, behavior, and other features of the remote system 102. This may permit the web interface 116 to navigate or tunnel to icons and/or directories on the remote system 102 and thereby avoid a UI which differs from the remote computing system UX. In this manner, user created directories, folders, sub-folder, files and so on may be displayed according to the OS of the remote computing system during remote access.

Figure 2:
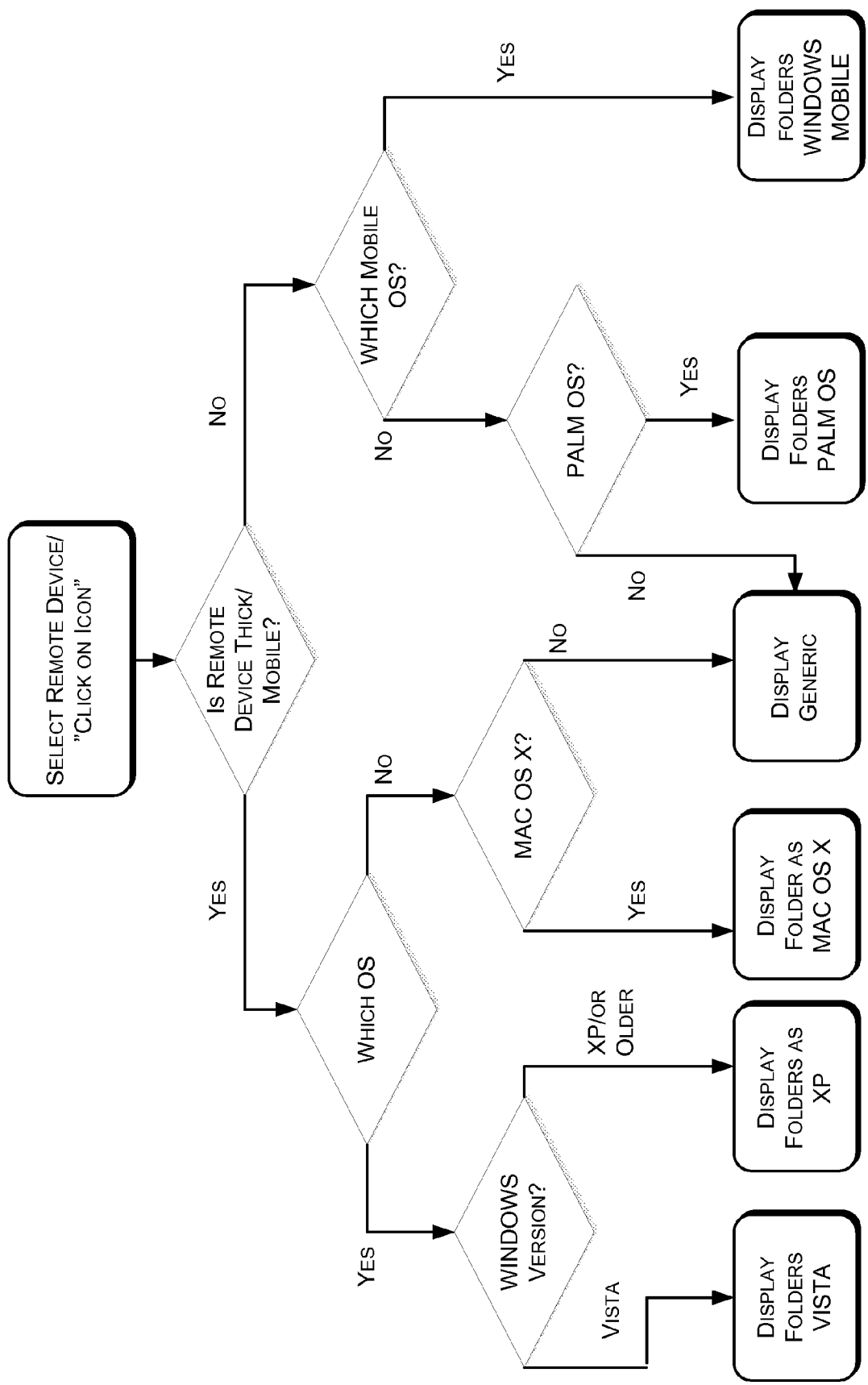
FIG. 2 is a highly diagrammatic flow diagram hierarchy depicting in exemplary implementations a decision tree for determining folder display.

Referring generally to FIG. 2, the described modules may be able to discern between common OS based on the directory, contents included in the directory or other files included in the system. For example, the redirection module or the file synchronization module may display a folder in accordance with a decision hierarchy which ascertains how a folder should be displayed in order to mimic the remote system, such as for commonly used OS.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., tangible memory and so on.

The following discussion describes transformation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Exemplary Procedures

The following discussion describes a methodology that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. A variety of other examples are also contemplated.

Figure 3:
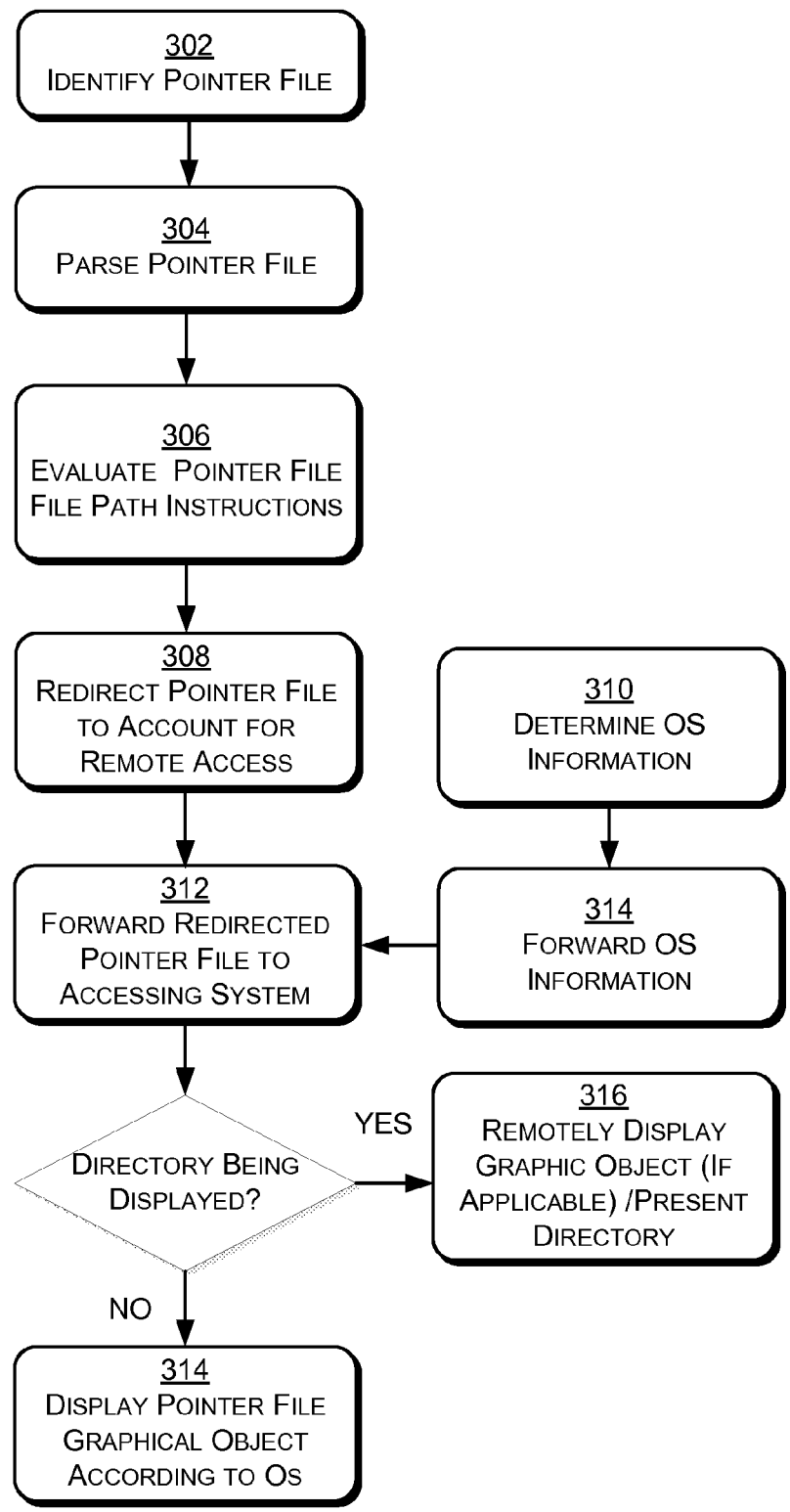
FIG. 3 is a flow diagram depicting a procedure in exemplary implementations in which remote redirection is used.

FIG. 3 discloses exemplary procedures for remote pointer file presentation. The procedures discussed herein may be used independently and/or in conjunction with remotely displaying user directories. Exemplary pointer files may include shortcut, alias files and so on for providing a mapped path for accessing a source file (e.g., the target of the pointer file).

A pointer file may be identified 302 based the file's characteristics such as file structure, contents of the file, file extension, and so on. For instance, in XP OS (Microsoft Corporation, Redmond, Wash.) a shortcut file may be identified based on the file's ".lnk" file extension which appears at the end of the file name. Similar identification techniques may be used for other types of pointer files, such as an alias file.

The identified pointer file, defining a local file path, may be parsed 304. For example, the file path or instructions to the location of the source file may be separated into individual instructions for use in representing the redirected pointer to the client for presentation in a remote access environment. In this way, the parsed "local centric" pointer file, such as a link file (".lnk") may, at least partially, serve as a basis for remote access redirected pointing. For instance, the individual instructions may be included in the redirected pointer file or used as a basis for reformed mapping of the pointer file.

While a pointer file may originally define a map for accessing a local folder, the parsed instructions in the pointer file may be used when generating a representation of the pointer file for communication to the client via a network connection. Local parsing and redirection may minimize data communication and downloading of original pointer file information. For instance, the individual pointer file instructions may be tested 306 or otherwise evaluated to determine if the particular instruction may be used during remote access.

In implementations, the parsed pointer file instructions may be the basis for generating a "new" pointer file which now redirected 308 to map between the remote interface and the source file or may augment/correct the existing pointer file to account for remote access. For example, a temporary redirected pointer file may be created using the original pointer file for local portions of the file. In other instances, the original file path contents may be augmented and/or corrected to form the redirected pointer file.

Additional information may be added to the pointer file in order to identify how a graphical object associated with the pointer file should be presented on the web interface. For instance OS specific information may be determined 310 and included in the representation of the pointer file forwarded 312 to the local (client) system. The OS information may include instructions for displaying the shortcut or for how the redirected file should perform. In other instances, the OS specific information may be communicated 314 separately from the redirected pointer file.

In the foregoing manner, a displayed 314 graphical object may appear and/or behave according to the OS of the remote system. For example, a file folder icon may be displayed 314 in accordance with PALM OS (Palm, Inc., Sunnyvale, Calif.), using PALM OS specific instructions, if the remote computing system is a PALM TREO (Palm, Inc., Sunnyvale, Calif.) running PALM OS even though the local system may be running Microsoft XP (Microsoft Corporation, Redmond, Wash.). In some instances, if the remote system is uncommon, the web interface may present a generic graphical object.

User directories, which may include a pointer file, may be remotely presented 316 to mimic the local directory UX for the remote system. File synchronization may be used in conjunction with and/or independent of pointer file redirection.

Directory synchronization may occur in a generally similar manner as file redirection. For example, a directory such as a folder may be identified, and the directory elements separated for use in presenting the directory remotely in accordance with the OS of the computing system. Identification may be based on the file containing the directory, the structure of the data within the directory file and so on. The remote system OS on the computing system, on which the directory resides, may be determined from the directory itself, the contents of the directory, based on other files within the system and so on. The OS information may be included with the data forming the directory, for communication to the client system mirroring the directory. The determined OS information may be separately transmitted to the remote system as well.

For example, data associated with the appearance, functionality, behavior and so on for the directory may be initially loaded to the client system so that the web interface matches that of the remote system UI. As a result, the directory UX via the web interface may mirror that of the remote computing system.

Figure 4:
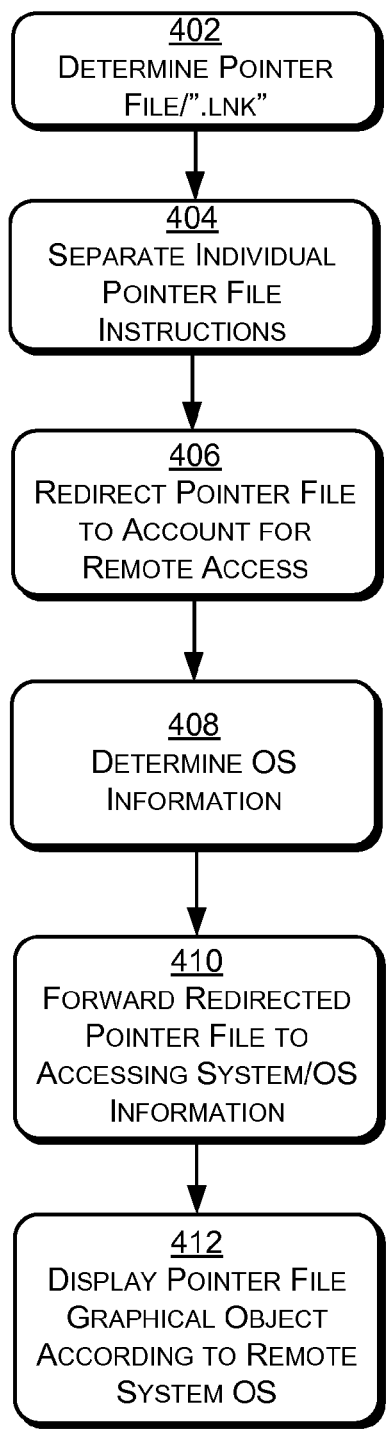
FIG. 4 is a flow diagram depicting a procedure in exemplary implementations in which remote pointing is used.

Referring to FIG. 4, computer readable media and accompanying techniques are discussed for pointer file redirection during remote access. The techniques discussed herein may be used when remotely presenting a pointer file, such as a shortcut or alias file. In this manner, the web interface may mimic the remote system in accordance with the described procedures.

The remote computing system may determine 402 the identity of a shortcut for redirection based on a characteristic of the pointer file. For example, an application running on the remote system may identify a shortcut file based on the file's "link" file extension. In other instances, the contents or structure of the file may be used to identify or confirm the file is a pointer file.

The pointer file may be separated 404 into discrete instructions or steps which map local access to the source file. Redirection 406 of the pointer file may include adding and/or correcting pointer file instructions. The identified pointer file may serve, at least partially, as a basis for redirecting 406 the pointer file so that the file path is mapped between the remote interface and the source file. For instance, the application may evaluate how the client system/web interface is to access the local system in order to map between the remote access point and the source file. For example, directions specific to the remote access session may be included in the redirected file path, so that a user selecting the associated icon is pointed to source file on the remote system.

In other instances, separate remote access pointer file may be created using the original pointer file as a template. For instance, while the pointer file may be remapped for remote access the local instructions may be used as a template for the redirected file path.

The OS running on the remote system may be determined 408 from the pointer file or from another file on the remote system. For example, characteristics of the pointer file may be evaluated to determine what version of an OS is running on the remote computing system. For example, a pointer file may be evaluated for characteristics which indicate the computing system is running MICROSOFT VISTA in comparison to MICROSOFT XP (Microsoft Corporation, Redmond Wash.). The OS information may be used to determine how a graphic object, such as an icon, should be presented and/or the behavior of the icon. For example, a shortcut icon representing the location of a directory on the system may offer a preview, if the remote system is operating in accordance with MICROSOFT VISTA OS (Microsoft Corporation, Redmond Wash.). OS information for indicating how the pointer file should be presented or behave may be forwarded 410 with the pointer file or may be separately communicated to the web enabled client.

A graphical objected associated with the redirected pointer file may be displayed 412 based on the forwarded redirected pointer file. For example, a folder icon associated with a shortcut file may be presented on a web interface presented by the client (e.g., the local system accessing the remote system). The appearance and/or behavior of the folder icon may be in compliance with the OS information forwarded with the pointer file. For instance, the OS information may be included in the pointer file information so that the local system knows how to present the icon and/or what behaviors the icon should possess.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    selecting a remote device by clicking an icon on a local device;
    determining if the remote device is a mobile device or is not a mobile device;
    if the remote device is a mobile device, distinguishing between a first operating system and a second operating system, or recognizing a failure to identify an operating system of the mobile device;
    if the remote device is not a mobile device, distinguishing between a third operating system and a fourth operating system, or recognizing a failure to identify an operating system of the non-mobile device;
    displaying folders, the folders being obtained from the remote device and displayed on the local device, according to an appearance of an operating system of the remote device if the operating system of the remote device is known, and according to a generic appearance if the operating system of the remote device was not identified;
    identifying a pointer file based on a file extension, the pointer file being at least one of a shortcut or an alias;
    parsing the pointer file defining a local path for accessing a file on the remote device;
    redirecting the pointer file so the pointer file defines a path from the local device to a location of a source file on the remote device; and
    representing, on the local device, an object indicated by the pointer file, the representing being according to how the operating system (OS) on the remote device represents the object.

2. The method as described in claim 1 wherein the remote device is configured to redirect the pointer file on behalf of the local device accessing the remote device.

3. The method as described in claim 1 wherein the pointer file has a link (lnk) extension.

4. The method as described in claim 1 wherein the remote device OS is determined from the pointer file.

5. The method as described in claim 1 further comprising synchronizing remote system files with the files of the local device.

6. The method as described in claim 1 wherein the local device is web enabled.

7. One or more computer-readable storage media comprising computer-executable instructions that, when executed, direct a local device to:

select a remote device by clicking an icon on the local device;
determine if the remote device is a mobile device or is not a mobile device;
if the remote device is a mobile device, distinguish between a first operating system and a second operating system, or recognize a failure to identify an operating system;
if the remote device is not a mobile device, distinguish between a third operating system and a fourth operating system, or recognize a failure to identify an operating system;
display folders, wherein the folders are obtained from the remote device and are displayed on the local device, according to an appearance of an OS of the remote device if the operating system of the remote device was distinguished, and according to a generic appearance if the operating system of the remote device was not identified;
identify a pointer file based on a file extension;
redirect the pointer file on the local device to provide a path from a remote interface to a source file which was originally designated by the pointer file, the pointer file being at least one of a shortcut or an alias;
forward the redirected pointer file including an indication of the operating system; and
represent, on the local device, an object indicated by the pointer file, the representing being according to how the operating system (OS) on the remote device represents the object.

8. The one or more computer-readable media as described in claim 7, wherein the distinguishing, if the remote device is a mobile device, is based on a characteristic of the pointer file.

9. The one or more computer-readable media as described in claim 8 wherein the characteristic is the file extension of the pointer file.

10. The one or more computer-readable media as described in claim 9 wherein the characteristic is a link (.lnk) extension.

11. The one or more computer-readable media as described in claim 7 wherein the remote interface is web-enabled.

12. A system comprising:
a computer hardware processor;
a computer-readable memory, communicatively coupled to the computer hardware processor, and configured to read and execute computer-executable instructions;
a file synchronization module, defined by the computer-executable instructions and configured to redirect access to a local directory, according to an operating system (OS) running on the system, to mirror local access on a local system to the local directory; and
a redirection module configured to redirect for remote access on a remote device of a pointer file's file path to a source file, the redirection for remote access comprising:
identifying the pointer file based on a file extension, the pointer file being at least one of a shortcut or an alias;
determining if the remote device is a mobile device or is not a mobile device;
if the remote device is a mobile device, distinguishing between a first operating system and a second operating system, or recognizing a failure to identify an operating system;
if the remote device is not a mobile device, distinguishing between a first operating system and a second operating system, or recognizing a failure to identify an operating system; and
displaying folders, the folders being obtained from the remote device and displayed on the local system, according to an appearance of an operating system of the remote device if the operating system of the remote device was distinguished, and according to a generic appearance if the operating system of the remote device was not identified; and
representing, on the local system, an object indicated by the pointer file, the representing being according to how the operating system (OS) on the remote device represents the object.

13. The system of claim 12 wherein the file synchronization module redirects individual files' file paths within the local directory for remote access to the individual files.

14. The system of claim 12 wherein the redirection module identifies the pointer file based on a characteristic of the pointer file.

15. The system of claim 12 wherein the redirection module forwards an indication of the OS.

* * * * *